A. DANIELSSON.
JOURNAL BOX FOR RAILWAY CARS AND SIMILAR VEHICLES.
APPLICATION FILED SEPT. 11, 1920.
1,401,141. Patented Dec. 27, 1921.
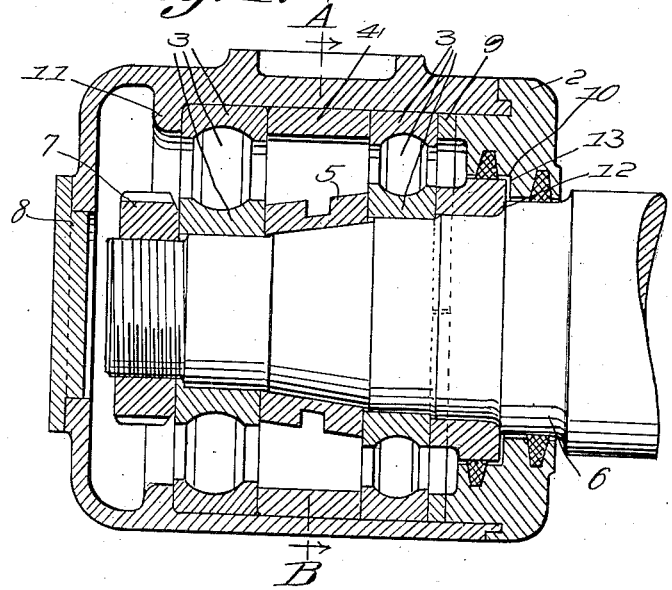
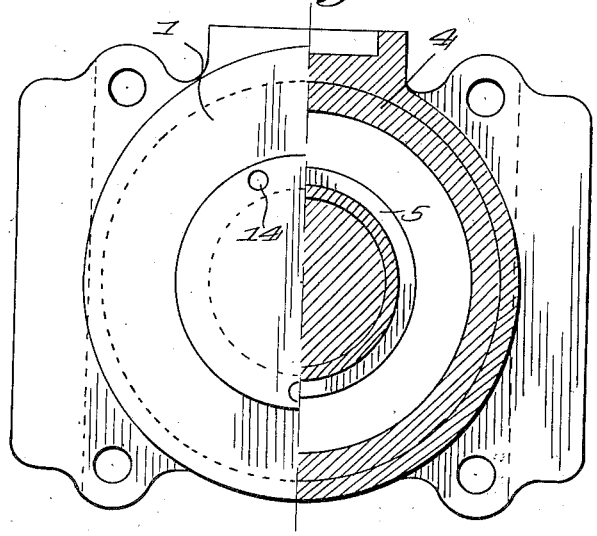
Inventor
A. Danielsson,
By H. R. Kerslake.
Attorney

UNITED STATES PATENT OFFICE.

AXEL DANIELSSON, OF STOCKHOLM, SWEDEN, ASSIGNOR TO NORDISKA KULLAGER AKTIEBOLAGET, OF GOTTENBORG, SWEDEN.

JOURNAL-BOX FOR RAILWAY-CARS AND SIMILAR VEHICLES.

1,401,141. Specification of Letters Patent. Patented Dec. 27, 1921.

Application filed September 11, 1920. Serial No. 409,696.

*To all whom it may concern:*

Be it known that I, AXEL DANIELSSON, a subject of the King of Sweden, residing at Stockholm, in the Kingdom of Sweden, have invented a new and useful Improvement in Journal-Boxes for Railway-Cars and Similar Vehicles, of which the following is a specification.

This invention relates to journal boxes for railway cars and similar vehicles of the type in which two antifriction ball or roller bearings are suitably mounted inside a casing and supported in axial directions by means of stationary members, distance rings and sleeves.

The present invention consists in the provision of a journal box of the above type characterized therein, that the outer race ring of the innermost bearing lying adjacent the cover is held in a stationary position therefrom by means of a divided, radially removable supporting ring positioned between said bearing and said cover, that the inner race ring of the outermost bearing rests against a nut screwed on the outer end of the journal, and that the inner race ring of the innermost bearing rests against a shoulder on the axle by means of a sleeve, so arranged that it can be actuated by the said cover when forced outward in a direction toward the said bearing, the last mentioned sleeve having such a length in comparison with the thickness of the said divided, axially removable distance ring situated between the cover and the outer race ring of the same bearing that, after the removal of said ring, the cover will force the said bearing outward, by means of the sleeve, against the corresponding inner race ring without interfering with the outer race ring.

In the accompanying drawing one embodiment of the invention is shown,

Figure 1 being a sectional view longitudinally of a journal box and

Fig. 2 in the right hand half a sectional view along the line A—B in Fig. 1, and in the left hand half an end elevation of the journal box.

The journal box shown has a casing 1 the inside being mainly of cylindrical form, with a cover 2 at the inner end of the box, adapted to tighten upon the journal 6. Within this casing 1 two antifriction ball or roller bearings 3 consisting of race rings and balls or rollers are mounted on the journal 6 separated from each other by a sleeve 5 around the journal 6 and a cylindrical ring 4 inside the casing 1. The two bearings are so mounted that they rest sidewise against flanges or rings on the inside of the casing and on the journal. Thus one of the outer race rings rests against an annular flange 11 on the inside of the casing and the other race ring against a ring 9 which is disposed inside the casing and rests against the cover 2. One of the inner race rings rests against a nut 7 screwed on the end of the journal 6 and the other inner race ring rests against a sleeve 10 resting against a shoulder 12 of the journal 6. The ring 9 is made in several parts to be easily removed if necessary. The thickness of the ring 9 is larger than the space between the ring 10 and the inside of cover 2.

The dismounting of this box with bearings is effected according to this invention in the manner described below.

The casing 1 is first removed by loosening the cover 2 and moving the casing off from the bearings to the left in the Fig. 1. The nut 7 is then unscrewed and the two antifriction bearings also removed toward the left with intermediate sleeves and rings, and lastly the rings 9 and 10 and the cover 2 are removed in the same way.

If during this procedure the antifriction bearings stick tightly to the journal, great force is required to remove them, and the application of such force frequently damages the bearings. In such a case, pressure must be applied on the cover 2, which rests against the ring 9, and thus the pressure will be transmitted through the rings 9 and 4 on to the outer race rings. If thereby the inner race rings are too tightly fixed on the journal an undue strain in the bearings will arise risking breakage of the bearings. The ring 9 is therefore divided and can be removed, thus leaving a free space between the cover 2 and the race ring of the innermost bearing, so that it will be possible to move the cover 2 up against the sleeve 10. When then a further pressure is applied upon the cover 2 this pressure now will be transmitted to the sleeve 10 and further to the inner race rings, which are the parts that are to be formed off the journal. Thereby the disadvantage referred to is overcome.

This invention further consists in means to prevent otherwise unnecessary dismounting of the journal boxes, for instance, in cases where the wheels have to be put up in a lathe to be re-turned. In order to make the end of the axle accessible without removing the journal boxes, these boxes are provided with removable small covers 8 at the outer end, whereby it is possible to mount the axle between the centers of the lathe without removing the journal boxes.

Having now particularly described and ascertained the nature of my said invention, and in what manner the same is to be performed, I declare that what I claim is:—

1. In a journal box for railway cars and similar vehicles, a casing having an inner chamber mainly of cylindrical form, a cover for the casing, inner and outer anti-friction bearings mounted in the chamber, means separating said bearings, a shoulder arranged in the casing against which the outer race ring of the outer bearing rests, a removable ring arranged between the outer race ring of the inner bearing and said cover, a journal extending into the casing, a member mounted on the journal and bearing against the inner race ring of the outer bearing, and a sleeve mounted upon the journal and bearing against the inner race ring of the inner bearing.

2. A journal box as claimed in claim 1 in which the last-mentioned sleeve is spaced away from the cover and in which the removable ring is of greater thickness than said space, so as to allow the cover to be moved against the sleeve when the removable ring has been detached from the journal box.

3. A journal box of the kind defined by claim 1 in which the removable ring is formed of segments, so as to permit the removal of said ring without detaching the anti-friction bearings from the journal.

4. A journal box as claimed in claim 1 in which the outer end of the casing is provided with a detachable lid to permit access to the outer end of the journal without removing the casing and anti-friction bearings from the journal.

5. A journal box including a journal having a substantial conical end provided with a number of spaced shoulders, a cover mounted on the inner end of said journal, an inner spacing ring mounted on the journal and bearing against one of said shoulders, a segmental outer spacing ring bearing against said cover, a plurality of anti-friction bearings mounted on the journal, the inner race ring of one of said bearings bearing against the inner spacing ring, sleeves spacing said bearings apart, a member mounted on said journal and engaging the inner ring of another one of said anti-friction bearings and a casing inclosing said bearings and provided with an internal shoulder which engages the outer race ring of one of the bearings.

6. A journal box of the kind defined by claim 5 in which the outer end of the casing is provided with a removable lid to permit access to the outer end of the journal.

In testimony whereof I have affixed my signature.

AXEL DANIELSSON.